(12) United States Patent
Kano et al.

(10) Patent No.: US 6,522,840 B2
(45) Date of Patent: Feb. 18, 2003

(54) CAMERA EQUIPPED WITH CAM MEMBER AND MOLDING DIE FOR PRODUCING THE CAM MEMBER

(75) Inventors: Mitsuo Kano, Hachioji (JP); Kenichi Iwaida, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/739,295

(22) Filed: Dec. 19, 2000

(65) Prior Publication Data

US 2001/0005453 A1 Jun. 28, 2001

(30) Foreign Application Priority Data

Dec. 22, 1999 (JP) .............................. 11-364711

(51) Int. Cl.[7] .............................................. G03B 13/10
(52) U.S. Cl. ....................................................... 396/379
(58) Field of Search ........................................... 396/379

(56) References Cited

U.S. PATENT DOCUMENTS 5,325,140 A * 6/1994 Torikoshi et al. ............ 396/379
6,252,628 B1 * 6/2002 Kobayashi ................... 396/379

* cited by examiner

*Primary Examiner*—David M. Gray
(74) *Attorney, Agent, or Firm*—Finnegan, Henderson, Farabow, Garrett & Dunner, L.L.P.

(57) ABSTRACT

A camera includes: a lens barrel holding a zoom lens; a zoom viewfinder optical system having a variable magnification lens to be moved in the optical axis direction; a cam pin integrally provided on the variable magnification lens; and a cam member to move the variable magnification lens being interlocked with the movement of the lens barrel. The cam member has the cam surface provided with a protruded portion which comes into contact with only a portion of a side wall of the cam pin.

7 Claims, 7 Drawing Sheets

CAMERA EQUIPPED WITH CAM MEMBER AND MOLDING DIE FOR PRODUCING THE CAM MEMBER

BACKGROUND OF THE INVENTION

The present invention relates to a camera equipped with a cam member which is interlocked with the movement of a lens barrel holding a zoom lens and changes the magnification of a zoom viewfinder, and to a molding die for a camera-use cam member.

A camera equipped with a photographic lens composed of a zoom lens has a zoom viewfinder to change magnification in association with zooming. That is, when a lens barrel holding the zoom lens is moved toward the optical axis direction by zooming, a cam plate having a cam surface is moved in association with the lens barrel. In the zoom viewfinder, a variable magnification lens to move in the optical axis direction is provided, and a cam pin is protruded from the variable magnification lens or a lens frame to hold the variable magnification lens, and engaged with the cam surface of the cam plate. Accordingly, by the movement of the cam plate, the variable magnification lens is moved in the optical axis direction, and the magnification of the zoom viewfinder is changed.

Figure 8:
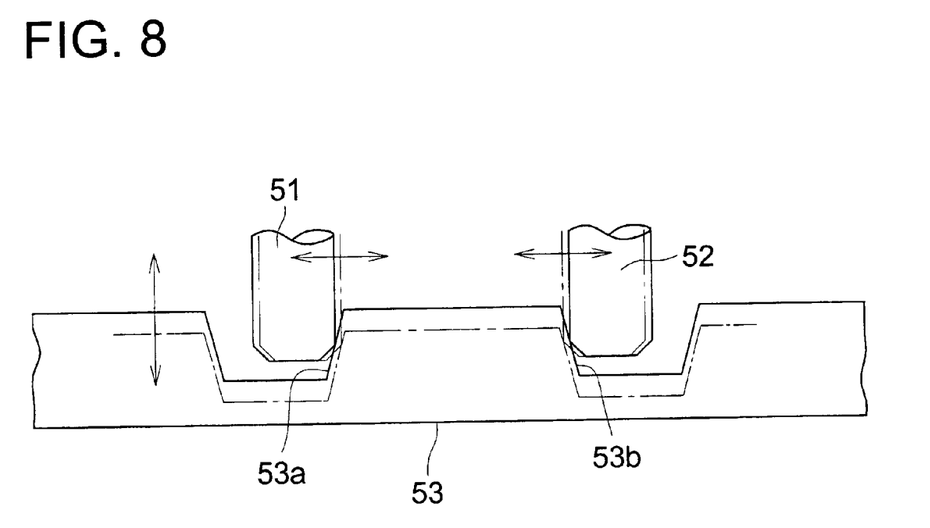
FIG. 8 is an enlarged sectional view of the conventional cam plate.
Figure 9A:
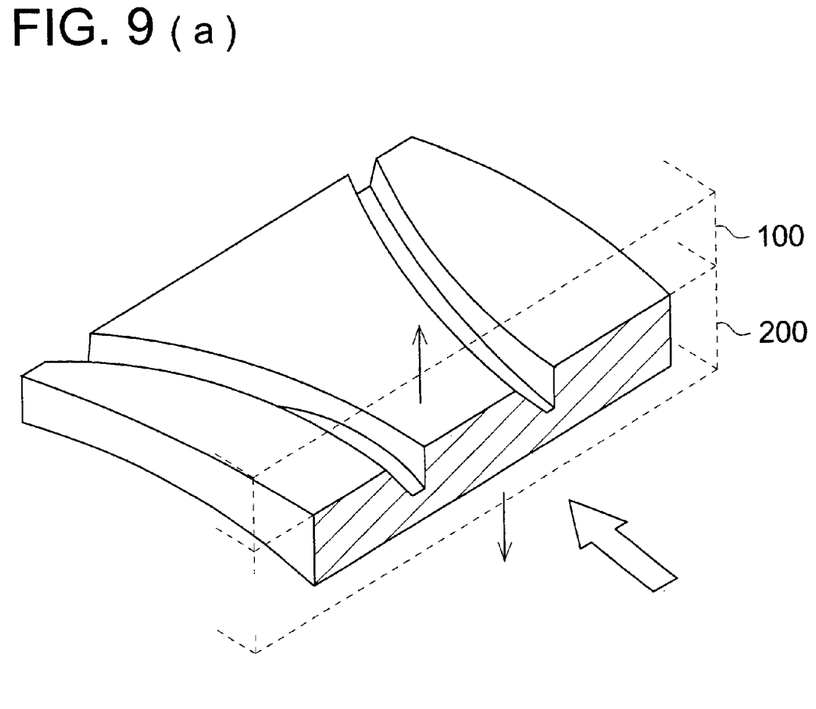
Figure 9B:
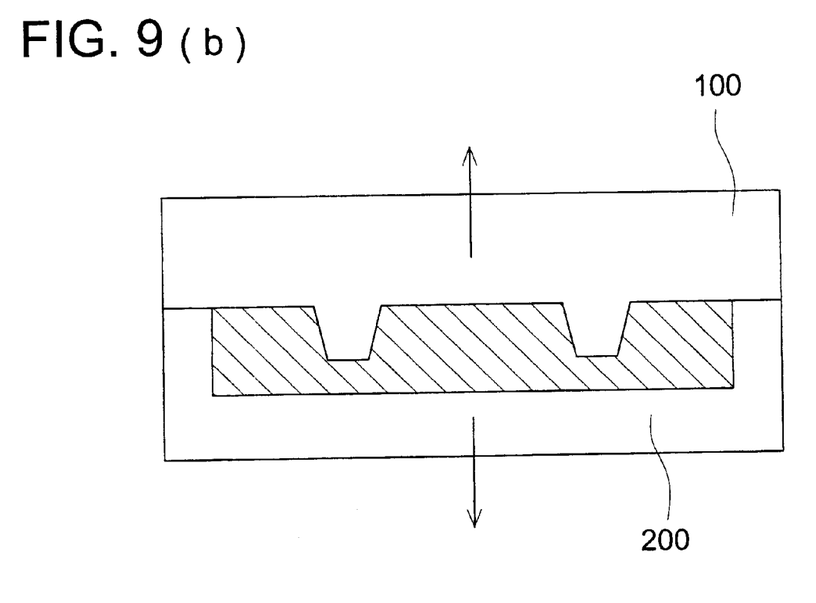

In FIG. 8, an example of the cam plate is shown in an enlarged sectional view. Two cam pins 51 and 52 are protruded from the variable magnification lens of the zoom viewfinder optical system, and it is assumed that a side wall of the cam pin 51 is in contact with a cam surface 53a of a cam plate 53, and a side wall of the cam pin 52 is in contact with a cam surface 53b of a cam plate 53. Generally, the cam plate 53 is resin molded, and because it is drawn from the molding die to the upper direction of the drawing, the drawing slope is necessary for the cam surfaces 53a and 53b, and the inclination surface is provided as shown in the drawing in the exaggeration. As a metallic die to mold such the cam plate 53, conventionally, a metallic die (as shown in FIGS. 9(a) and 9(b)) is well known. An upper surface metallic die 100 to mold the upper surface side of the cam plate 53 is moved upward, and a lower surface metallic die 200 to mold the lower surface side is moved downward. Herein, specifically, in the case where the cam plate 53 is molded circular arc-like, corresponding to the shape of the lens barrel, when the draft angle is not provided as the cam surfaces 53a and 53b, the drawing can not be conducted from the metallic die after the molding.

Herein, in practice, a fluctuation of the dimension of the variable magnification lens, a fluctuation of the assembling position of a frame holding the zoom viewfinder optical system, and a fluctuation of the assembling position of the cam plate 53, are generated. Therefore, as shown in FIG. 8, sometimes, the relative position of the cam plate 53 to the cam pins 51 and 52 fluctuates to the upper or lower direction from the position of the solid line to the position of the broken line. As the result, because the contact positions of the cam pins 51 and 52 with the cam surfaces 53a and 53b fluctuate in the left and right directions, the position of the variable magnification lens fluctuates in the left and right directions, that is, fluctuates in the optical axis direction of the zoom viewfinder optical system, resulting in that an accurate magnification change operation is not conducted.

SUMMARY OF THE INVENTION

In view of the foregoing problems, the present invention is attained, and the first object of the present invention is to propose a camera in which, even when the cam pin or cam plate is fluctuated upward or downward, the position of the variable magnification lens is not fluctuated in the optical axis direction.

Further, the second object of the present invention is to propose the molding die for the camera-use cam member by which such the cam plate is molded.

Further, in the case where the cam plate is held in the gap between the lens barrel holding the zoom lens and the case holding the zoom viewfinder optical system, when the cam plate is moved left and right, the pressing by the frame becomes insufficient and the cam plate is floated. Then, the cam surface is tilted from the reference position, and the accurate cam driving can not be conducted.

The third object of the present invention is to propose the camera in which such the floating of the cam plate is prevented by a simple structure.

The above object is attained by the following structure.

1. A camera having the following structure, which comprises: a lens barrel holding a zoom lens; a zoom viewfinder optical system having a variable magnification lens to be moved in the optical axis direction; a cam pin integrally provided with the variable magnification lens; and a cam member to move the variable magnification lens being interlocked with the movement of the lens barrel, wherein the cam member has the cam surface provided with a protruded portion which comes into contact with only a portion of a side wall of the cam pin.

2. A molding die for a camera-use cam member having the following structure, which comprises: a cam surface molding member including a cam surface molding surface to mold the cam surface, which comes into contact with the cam pin integrally provided with the variable magnification lens of the zoom viewfinder optical system, and moves the variable magnification lens in the optical axis direction, following the movement of the lens barrel to hold the zoom lens; and a movement mechanism to move the cam surface molding member so that the cam surface molding surface moves in the almost perpendicular direction to the cam surface, wherein the cam surface molding surface includes a protruded portion molding surface to mold the protruded portion, by which the cam surface is brought into contact with only a portion of the side wall of the cam pin.

Further, the first object mentioned above is solved by the following structure.

A camera which comprises: a lens barrel to hold a zoom lens; a zoom viewfinder optical system having a variable magnification lens to be moved in the optical axis direction; a cam pin protruded from the variable magnification lens or a lens frame to hold the variable magnification lens; and a cam member, having a cam surface which comes into contact with a side wall of the cam pin, and driving the cam pin being interlocked with the movement of the lens barrel, the camera is characterized in that the cam surface comes into contact with the side wall of the cam pin only at the end portion on the variable magnification lens side, and the cam surface except for the end portion is retreated from the side wall of the cam pin.

The second object is solved by the following structure.

A molding die for a camera-use cam member to mold the cam member, which has a cam surface to come into contact with a side wall of a cam pin protruded from a variable magnification lens which is moved in the optical axis direction and changes the magnification of a zoom viewfinder optical system, or from a lens frame to hold the variable magnification lens, and which drives the cam pin being interlocked with the movement of a lens barrel to hold a zoom lens, the molding die for a camera-use cam member is characterized in that: the cam surface comes into contact with the side wall of the cam pin only at the end portion on the variable magnification lens side, and the cam surface except for the end portion is retreated from the side wall of the cam pin, and the metallic die to mold the cam surface is moved in the direction almost perpendicular to the axial direction of the cam pin.

The third object is solved by the following structure.

A camera which comprises: a lens barrel to hold a zoom lens; a zoom viewfinder optical system having a variable magnification lens to be moved in the optical axis direction; a case to hold the zoom viewfinder optical system; a cam pin protruded from the variable magnification lens or a lens frame to hold the variable magnification lens; a cam member, having a cam surface which comes into contact with a side wall of the cam pin, and driving the cam pin being interlocked with the movement of the lens barrel, and arranged in the gap between the lens barrel and the case, the camera is characterized in that, irrespective of the movement position of the cam member, a floating prevention member integrally formed with the case is arranged above at least a portion of the cam member.

BRIEF DESCRIPTION OF THE DRAWINGS

FIG. 5(*a*) is a perspective view showing the cam plate and a metallic die, and FIG. 5(*b*) is an enlarged sectional view of the cam plate and the metallic die.

FIG. 9(*a*) is a perspective view showing the conventional cam plate and the metallic die, and FIG. 9(*b*) is an enlarged sectional view of the conventional cam plate and the metallic die.

DETAILED DESCRIPTION OF THE PREFERRED EMBODIMENT

Referring to the drawings, an embodiment of a camera of the present invention will be detailed below.

Figure 1:
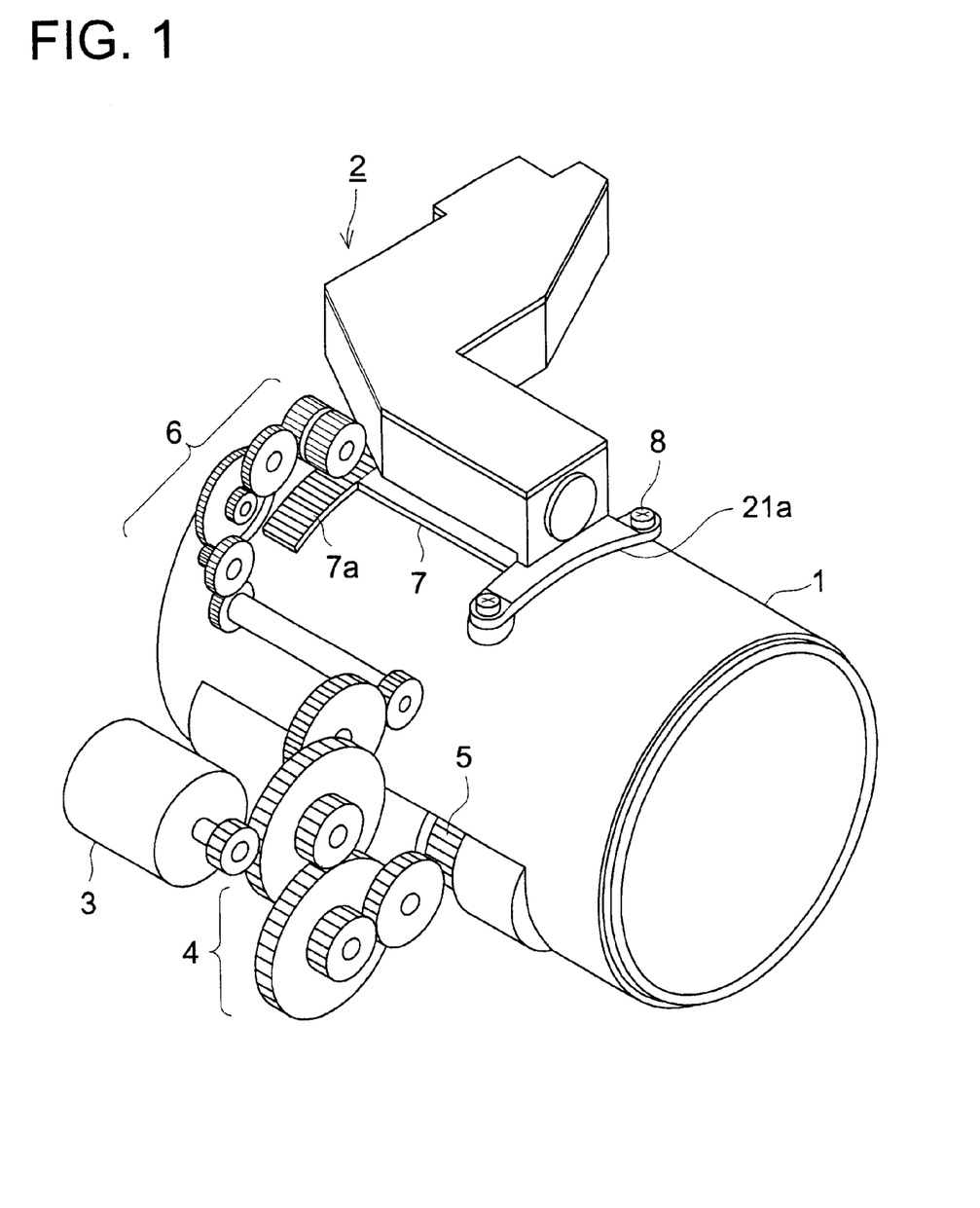
FIG. 1 is a perspective view of a lens barrel and a zoom viewfinder.

Initially, referring to FIG. 1, the relationship of a lens barrel and a zoom viewfinder will be described below. FIG. 1 is a perspective view of the lens barrel and the zoom viewfinder.

Numeral 1 is a lens barrel to hold a zoom lens which is a photographic lens, and numeral 2 is a zoom viewfinder. When a zoom button, not shown, is operated, a motor 3 is rotated, and rotates a gear 5 provided in the lens barrel 1 through the first reduction gear train 4. Then, the rotation of the gear 5 is transmitted to an inner mechanism of the lens barrel 1, and drives a lens group inside the lens barrel, and conducts the zooming. The rotation of the first reduction gear train 4 is transmitted to a partial gear 7*a* provided on a cam plate 7 through the second reduction gear train 6, and rotates the cam plate 7 in the left and right directions in the drawing. In this connection, the cam plate 7 is arranged in the gap between the lens barrel 1 and the zoom viewfinder 2.

Figure 2:
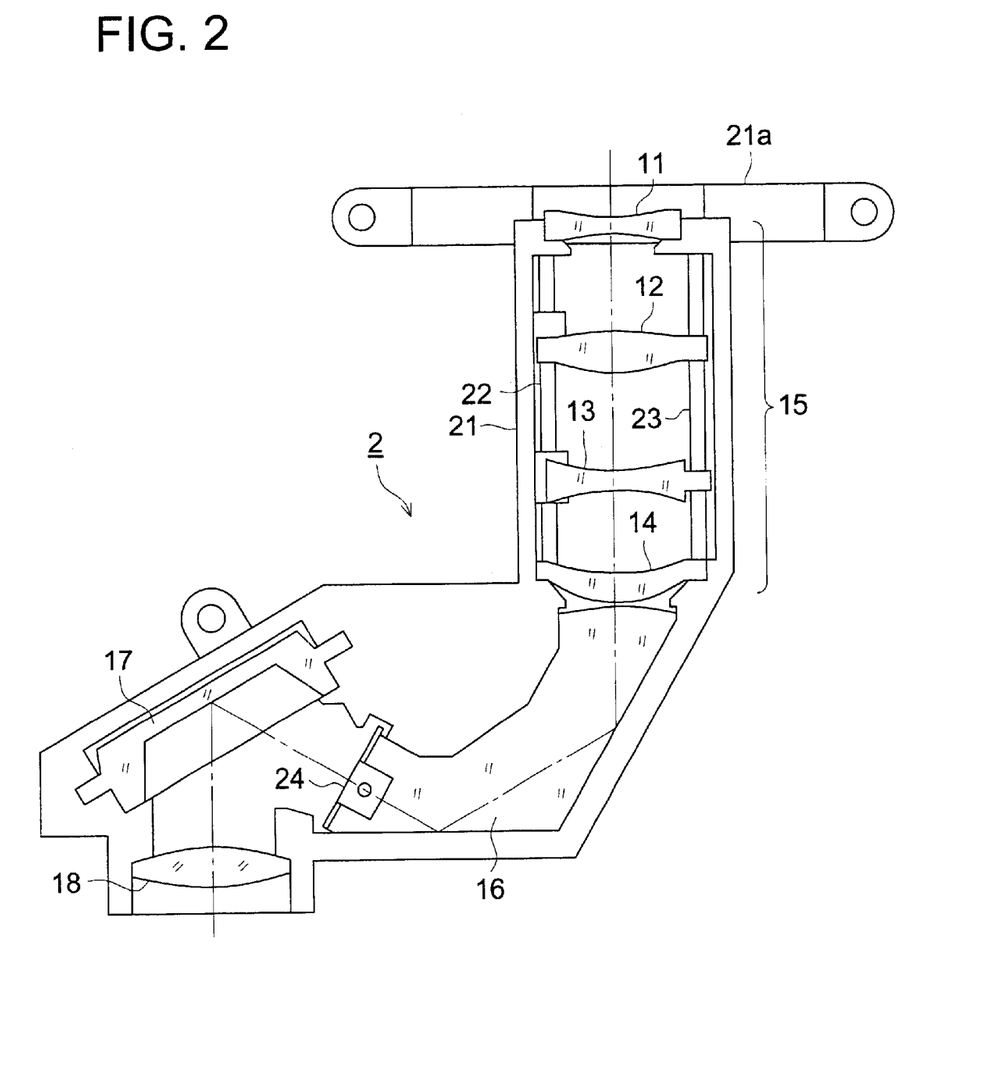
FIG. 2 is a cross sectional view of the zoom viewfinder.

Next, referring to FIG. 2, the structure of the zoom viewfinder 2 will be described. FIG. 2 is a cross sectional view of the zoom viewfinder 2.

In the optical system of the zoom viewfinder 2, an objective optical system 15 is formed of the first lens 11 which is a fixed lens, the second lens 12 which is a variable magnification lens, the third lens 13 which is a variable magnification lens, and the fourth lens 14 which is a fixed lens. After them, a refracting optical system is formed by a prism 16, and next to it, an ocular optical system is formed by an eyepiece 18.

In the objective optical system 15, the first lens 11 and the fourth lens 14 are fixed to a case 21, and the second lens 12 and the third lens 13 are moved in the optical axis direction along guide shafts 22 and 23. As described above, the cam plate 7 is rotated being interlocked with the zooming movement of the lens barrel 1, and although the detail will be described later, by the rotation of the cam plate 7, the second lens 12 and the third lens 13 are moved in the optical axis direction. According to this, the focal distance of the objective optical system 15 is changed and the magnification of the zoom viewfinder optical system is changed.

The subject light enters the objective optical system 15, and after the subject light projected into the prism 16 and is reflected two times, the light is projected, and the projection surface is a focusing position of the objective optical system 15, and the subject light is focused. This focused image is reflected by the reflection mirror 17, and enlarged by the eyepiece 18 and observed.

In this connection, a visual field frame 24 is arranged on the projection surface of the prism 16, and the a visual field of the viewfinder is regulated.

Further, the reflection mirror 15 is a roof mirror whose longitudinal sectional shape is concave in the V-letter-shape.

An image formed by the objective optical system 15 is inverted vertically and horizontally, however, because in the vertical direction, it is reflected by two times on the reflection mirror, and in the horizontal direction, it is reflected by two times by the prism 16, and reflected by one time on the reflection mirror 17, the image can be visually confirmed as the rightly erected image in the vertical and horizontal directions, by the eyepiece 18.

Figure 3:
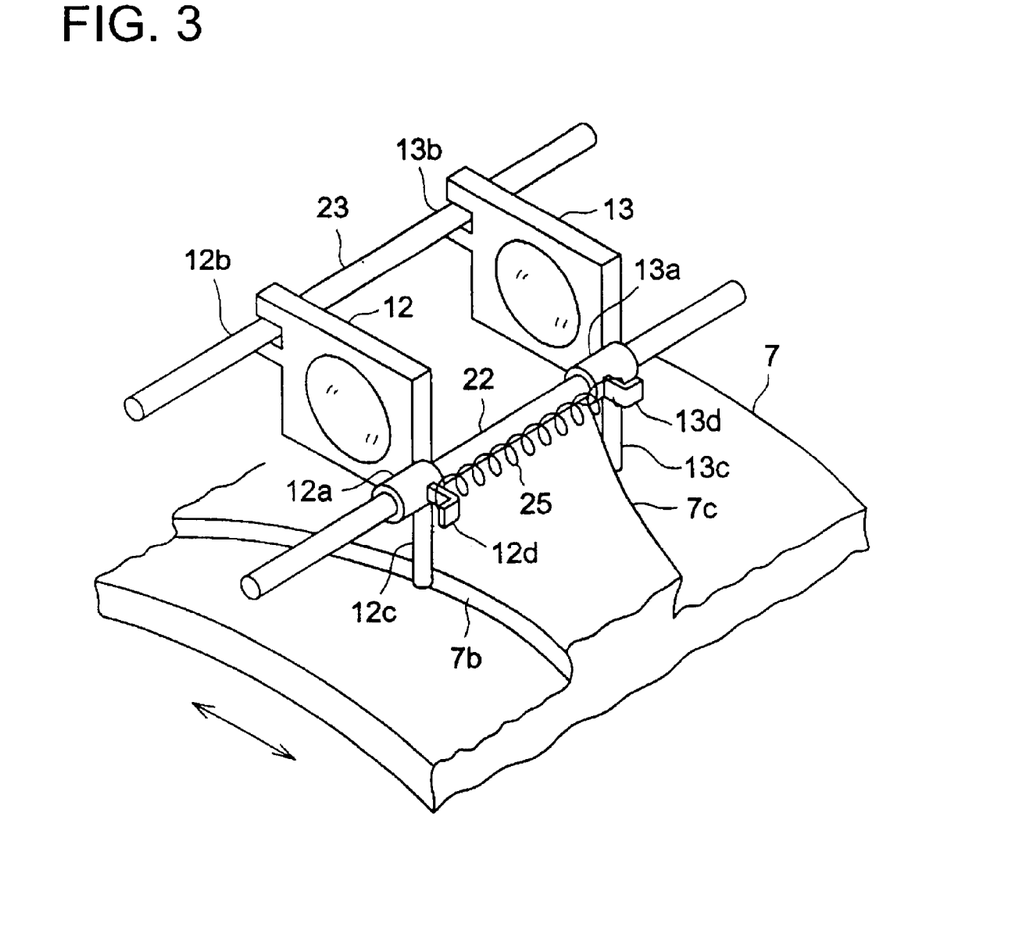
FIG. 3 is a perspective view of a cam plate and a variable magnification lens.

Next, referring to FIG. 3, the structure to move the second lens 12 and the third lens 13 which are variable magnification lenses, in the optical axis direction by the cam plate 7, will be described. FIG. 3 is a perspective view of the cam plate 7 and the variable magnification lenses.

A cylindrical guide portion 12*a* is integrally provided with the second lens 12 in the right lower portion of the second lens 12 when viewed from the front, and in the same manner, a cylindrical guide portion 13*a* is integrally provided with the third lens 13 in the right lower portion of the third lens 13. A guide shaft 22 penetrates through holes provided in the cylindrical guide portion 12*a* and the cylindrical guide portion 13*a*. Further, when viewed from the front, the second lens 12 has a cutout portion 12*b* in the left upper portion of the second lens, and in the same manner, the third lens 13 has a cutout portion 13*b* in the left upper portion of the third lens. A guide shaft 23 penetrates through the cutout portion 12*b* and the cutout portion 13*b*.

Further, a cam pin 12*c* is provided in the lower portion of the cylindrical guide portion 12*a* of the second lens 12, and a cam pin 13c is provided in the lower portion of the cylindrical guide portion 13a of the third lens 13. Further, on the side portion of the cylindrical guide portion 12a, a spring hook 12d is provided, and on the side portion of the cylindrical guide portion 13a, a spring hook 13d is provided, and a tension spring 25 is hooked on both of them. Accordingly, by the tension spring 25, the cam pins 12c and 13c are forced in the approaching direction to each other.

As described above, the cam plate 7 is arranged blow the zoom viewfinder 2, and the cam plate 7 has a cam surfaces 7b and 7c. Then, a side wall of the cam pin 12c is pressure contacted with the cam surface 7b, and a side wall of the cam pin 13c is pressure contacted with the cam surface 7c.

According to this, as described above, when the cam plate 7 is rotated in the arrowed direction being interlocked with the lens barrel 1, because the cam pin 12c is moved by the cam surface 7b, and the cam pin 13c is moved by the cam surface 7c, the second lens 12 and the third lens 13 are moved in the optical axis direction along the guide shafts 22 and 23.

Figure 4:
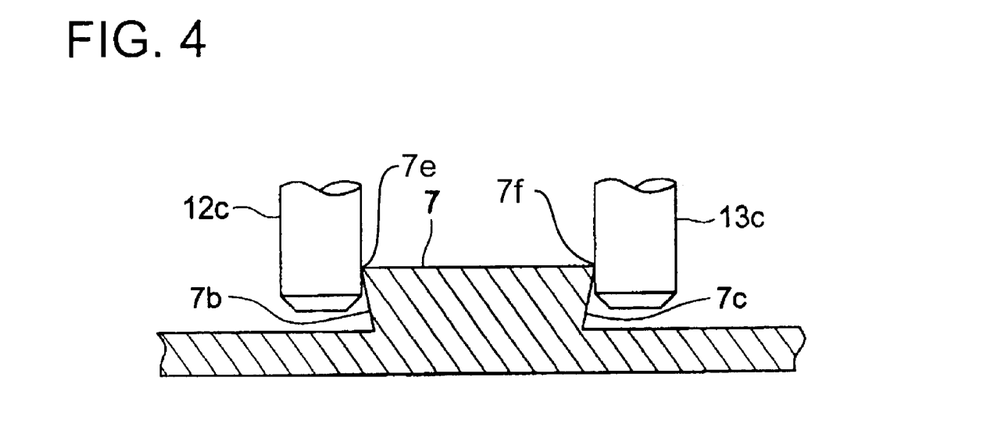
FIG. 4 is an enlarged sectional view of the cam plate.

Next, referring to FIG. 4, the cam surfaces 7b and 7c will be detailed. FIG. 4 is an enlarged sectional view of the cam plate.

The cam surfaces 7b and 7c are formed in the reversal slope to the conventional technological one. Thereby, the side wall of the cam pin 12c comes into contact with the cam surface 7b only at the end portion, that is, the protrusion 7e, of the second lens 12 side in the cam surface 7b, and the cam surface 7b except for the end portion is retreated from the cam pin 12c. Further, the side wall of the cam pin 13c comes into contact with the cam surface 7c only at the end portion, that is, the protrusion 7f, of the third lens 13 side in the cam surface 7c, and the cam surface 7c except for the end portion is retreated from the cam pin 13c. Accordingly, even when the fluctuation of the dimension of the variable magnification lens, the fluctuation of the assembling position of the case 21, or the fluctuation of the assembling position of the cam plate 7 is generated, when the cam plate 7 is in the same position, the variation of the interval of the cam pin 12c and the cam pin 12d is not generated as in the conventional technology, and the second lens 12 and the third lens 13 always conduct the movement determined by the cam surfaces 7b and 7c.

In this connection, a slide core system is used for the cam surface as the molding method, and in the cam surface 7b, after the metallic die is moved left, it is moved upward, and in the cam surface 7c, after the metallic die is moved right, it is moved upward. Thereby, even the undercut shape as shown in FIG. 4, can be molded.

Figure 5:
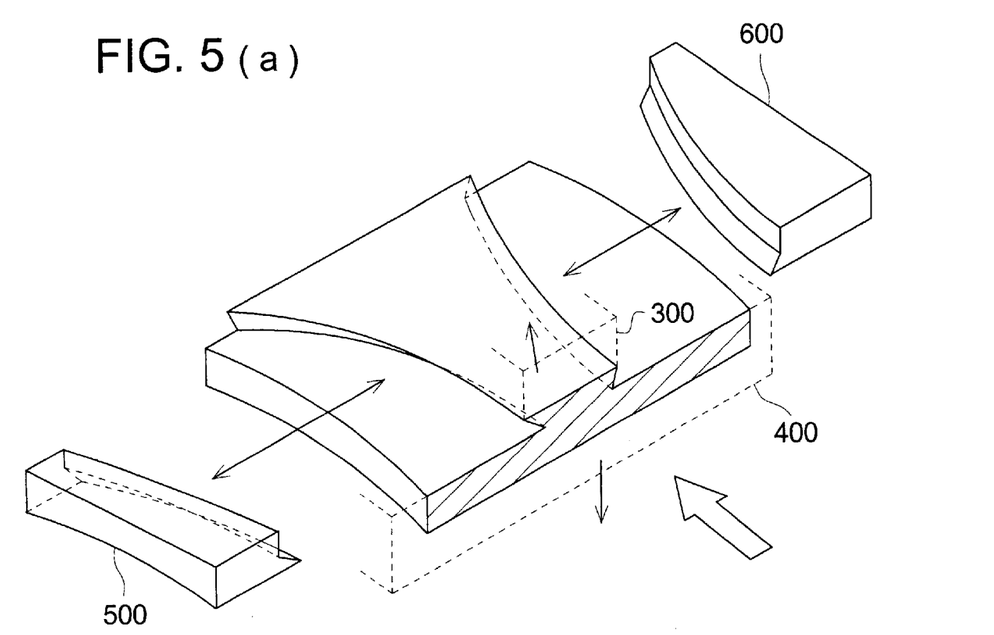

Further, as another molding method using the slide core system, for example, as shown in FIGS. 5(a) and 5(b), the structure of metallic die of 4-division system can also be considered. As the method of the division, the following can be applied: an upper surface metallic die 300 for molding the upper surface of the cam plate 53, a lower surface metallic die 400 for molding the lower surface side of the cam plate 53, a left surface metallic die 500 for molding the cam surface 7b side, and a right surface metallic die 600 for molding the cam surface 7c side. Then, after the molding, the upper and lower surface metallic dies 300 and 400 are respectively moved in the vertical direction, and the left and right surface metallic dies 500 and 600 are respectively slid in the horizontal direction, and the mold product is taken out.

Figure 6:
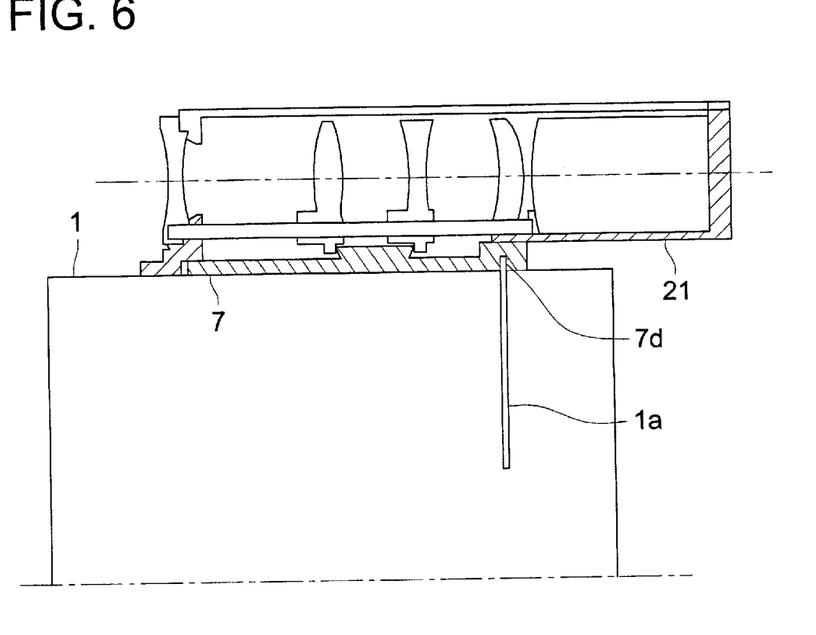
FIG. 6 is a sectional view of the cam plate in parallel with the optical axis.
Figure 7:
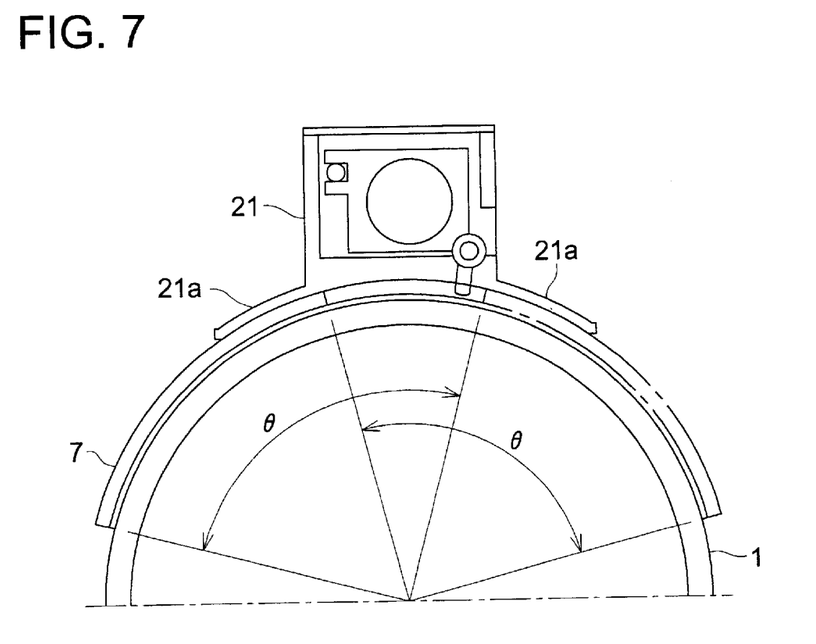
FIG. 7 is a sectional view of the cam plate perpendicular to the optical axis.

Next, referring to FIG. 6 and FIG. 7, a method by which the cam plate 7 is held, will be described. FIG. 6 is a sectional view of the cam plate 7 which is parallel to the optical axis, and FIG. 7 is a sectional view of the cam plate perpendicular to the optical axis.

As described above, the cam plate 7 is arranged in a gap between the lens barrel 1 and the zoom viewfinder 2, and the position of the vertical direction is decided. Further, a protrusion 1a formed into the arc-shape is engaged with a long groove 7d provided on the lower surface of the cam plate 7 in the rear portion of the lens barrel 1, and the cam plate 7 is positioned in the optical axis direction.

In this connection, the cam plate 7 is formed into an arc-shape along the lens barrel 1, and is rotated around the optical axis. When the left and right width of the cam plate 7 is expressed by an angle θ around the optical axis, as can be clearly seen from FIG. 7, the cam plate 7 is largely rotated left and right. At this time, a floating prevention portion 21a is integrally formed on the front portion of the case 21 so that the upward floating of the cam plate 7 is always pressed, and even when the cam plate 7 is rotated in any direction of the left or right, the floating is securely prevented by the floating prevention portion 21a.

Incidentally, the left and right end portions of the floating prevention portion 21a are screwed by machine screws 8 onto the lens barrel 1 as shown in FIG. 1.

In the above embodiment, although the structure in which the cam pin is integrally protruded from the variable magnification lens, is applied, the present invention is not limited to this, a lens frame to hold the variable magnification lens is provided, and the cam pin may be protruded from the lens frame.

The cam member in the present invention corresponds to the cam plate 7, but the cam member may not be necessarily formed into the circular arc-shape, but it may be a flat plane-shape.

According to the camera of the present invention, even when the relative position of the cam pin and the cam plate is fluctuated upward and downward by a fluctuation of the dimensions of the variable magnification lens, a fluctuation of the assembling position of the case to hold the zoom viewfinder optical system, and a fluctuation of the assembling position of the cam plate 53, the position of the variable magnification lens does not fluctuate in the optical axis direction, and the magnification of the zoom viewfinder optical system can be accurately changed.

According to the molding die for a camera-use cam member of the present invention, a cam member having the above described effects as in the camera, can be easily molded.

According to the camera of the present invention, the floating of the cam plate can be prevented by a simple structure.

What is claimed is:
1. A camera comprising:
 (a) a lens barrel for holding a zoom lens;
 (b) a zoom finder optical system having at least one variable magnification lens which moves in an optical axis direction;
 (c) a cam pin integrally provided on each of the at least one variable magnification lens; and
 (d) a cam member for moving the at least one variable magnification lens interlocked with movement of the lens barrel,
 wherein the cam member has a cam surface corresponding with the cam pin, an upper portion of the cam surface forming a protrusion, and a lower portion of the cam surface being retreated from the corresponding cam pin.

2. The camera of claim 1, wherein the protrusion is arranged in an edge portion of the cam surface on a side at which the variable magnification lens is located.

3. The camera of claim 1, wherein the cam member comprises a circular arc shaped cam plate.

4. The camera of claim 3, wherein the cam plate has a same curvature as that of an outer circumferential surface of the lens barrel.

5. The camera of claim 1, wherein the cam member is fixed to the lens barrel.

6. The camera of claim 5, wherein the variable magnification lens moves in optical axis direction in association with a rotation of the lens barrel following a zooming.

7. The camera of claim 5 further comprising
a frame for holding the zoom finder optical system; and
a floating preventive member for preventing the frame and the cam member from floating caused by the movement of the lens barrel.

* * * * *